(12) United States Patent
Winter et al.

(10) Patent No.: US 6,579,348 B1
(45) Date of Patent: Jun. 17, 2003

(54) METHOD FOR PRODUCING A SEALING CONNECTION

(75) Inventors: Martin Winter, Nonweiler (DE); Ralf Wnuk, Bexbach (DE); Norbert Lang, Blieskastel (DE); Jürgen Hausdorf, Saarbrücken (DE)

(73) Assignee: Hydac Process Technology GmbH, Neunkirchen (DE)

( * ) Notice: Subject to any disclaimer, the term of this patent is extended or adjusted under 35 U.S.C. 154(b) by 0 days.

(21) Appl. No.: 09/763,900
(22) PCT Filed: Aug. 26, 1999
(86) PCT No.: PCT/EP99/06267
§ 371 (c)(1), (2), (4) Date: May 30, 2001
(87) PCT Pub. No.: WO00/20090
PCT Pub. Date: Apr. 13, 2000

(30) Foreign Application Priority Data

Oct. 1, 1998 (DE) .......................... 198 45 145

(51) Int. Cl.⁷ .................. B01D 46/00; B01D 46/02; B01D 46/24
(52) U.S. Cl. .................. 95/273; 55/498; 55/DIG. 5; 55/502
(58) Field of Search .................. 55/498, 499, 502, 55/510, 374, 378, 379, 525, DIG. 5; 95/273

(56) References Cited

U.S. PATENT DOCUMENTS

| | | | | |
|---|---|---|---|---|
| 2,258,926 A | * | 10/1941 | Campbell | 55/502 |
| 3,937,621 A | * | 2/1976 | Gravley | 55/378 |
| 4,194,894 A | * | 3/1980 | Noland | 55/379 |
| 4,536,291 A | * | 8/1985 | Hoffmann et al. | 55/498 |
| 4,543,112 A | * | 9/1985 | Ackley et al. | 55/502 |
| 5,246,472 A | * | 9/1993 | Herman et al. | 55/498 |
| 5,389,119 A | * | 2/1995 | Ferronato et al. | 51/293 |
| 5,605,555 A | | 2/1997 | Patel et al. | 55/502 |
| 6,056,799 A | * | 5/2000 | Unrath et al. | 55/498 |

FOREIGN PATENT DOCUMENTS

| | | |
|---|---|---|
| EP | 0 867 215 | 9/1998 |
| GB | 1003164 | 10/1961 |

OTHER PUBLICATIONS

Form PCT/IB/338 (Notification of Transmittal of Copies of Translation of the International Preliminary Examination Report).
Form PCT/IPEA/409 (International Preliminary Examination Report).

* cited by examiner

*Primary Examiner*—Duane Smith
*Assistant Examiner*—Jason M. Greene
(74) *Attorney, Agent, or Firm*—Smith, Gambrell & Russell, LLP

(57) ABSTRACT

A method for producing a sealing connection between a filter mat of a tubular filter element and a metallic head piece encircling the filter element at one end. The head piece has an annular groove accommodating the edge of the filter mat. In order to reduce the internal diameter of the annular groove, the wall adjacent to the periphery is compressed by the periphery of the head piece towards the interior by applying a force of pressure which is directed radially towards the interior. The wall of the annular groove adjacent to the periphery is provided with an enlargement which enlarges the diameter of the head piece. The force of pressure for compressing the wall is applied in the area of said enlargement.

19 Claims, 2 Drawing Sheets

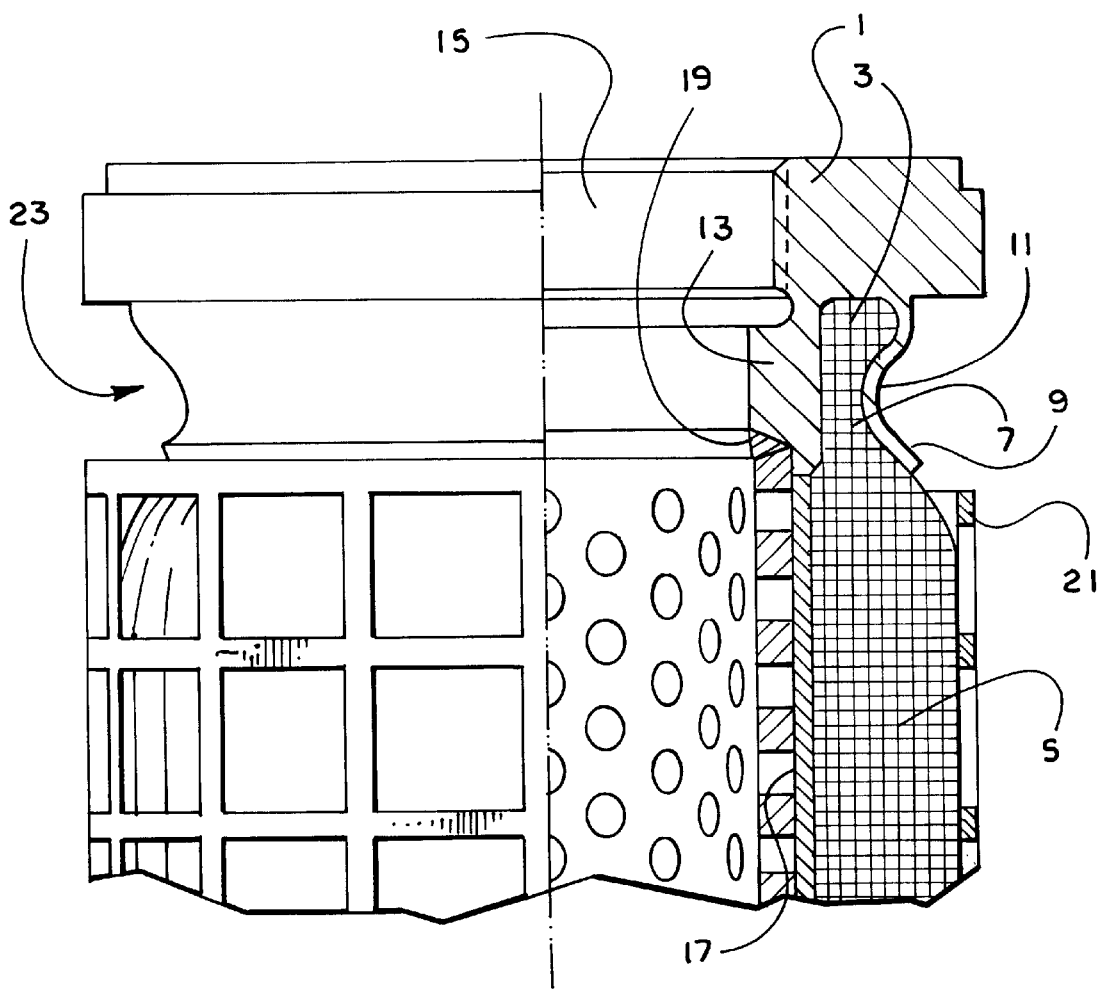
Fig_1

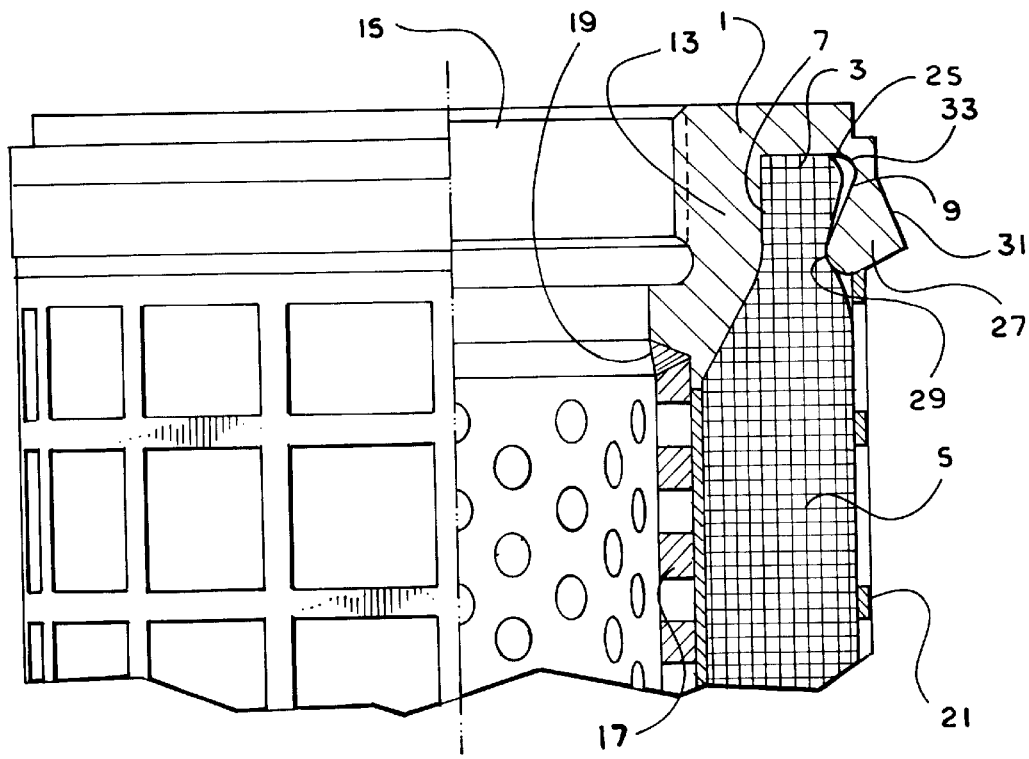
Fig_2
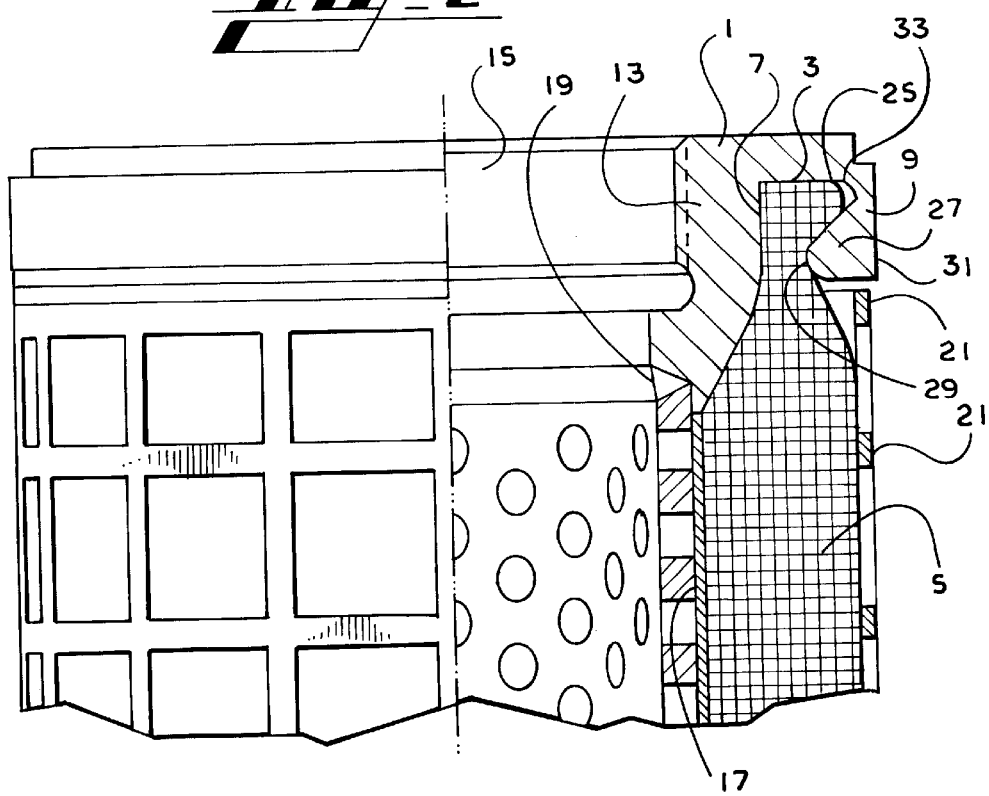
Fig_3

METHOD FOR PRODUCING A SEALING CONNECTION

BACKGROUND OF THE INVENTION

The invention concerns a method for establishing a sealing connection between the filter mat of a tubular filter element and a metal headpiece which encloses the element on one side in which an annular groove to receive the edge of the filter mat is formed in the headpiece, and the wall of the headpiece, which is adjacent to the circumference, is pressed from the circumference of the headpiece inwards so as to reduce the inside diameter of the annular groove by applying pressure, which is directed radially toward the inside.

Known methods of this type are preferably used with filter elements, which are provided for the filtering of media which are hard to control and where filter mats made of stainless steel are used. The media which can be taken into consideration for such filter elements are highly viscous and/or aggressive fluids with temperatures which are often very high, for example, polymer melts which are filtered, so as to be supplied to spinning nozzles to establish a textile starting material.

Although the known methods of the type mentioned in the beginning make possible the establishing of a satisfactory sealing connection between the filter mat and the headpiece, the pressing of the outer wall of the groove formed in the headpiece with the filter mat, however, leads to a constriction of the pertinent circumference area of the filter element. This area of reduced diameter forms a dead space in the circumference area of the filter element, in which the medium to be filtered accumulates, wherein in the case of highly viscous and/or melted media, there is a thermal degradation of the material. This leads to operating disturbances and operating interruptions and to quality losses in the product.

BRIEF SUMMARY OF THE INVENTION

The goal of the invention is to indicate a method, which makes possible the establishing of a satisfactory sealing connection and also ensures improved operating characteristics of the pertinent filter element.

With a method of the type mentioned in the beginning, this goal is attained, in accordance with the invention, in that the wall of the annular ring, which is adjacent to the circumference, is provided with a thickening that increases the diameter of the headpiece and that pressure is applied for the compression in the area of this thickening.

This makes it possible to prevent the compression in the circumference area of the headpiece from leading to a constriction in the pertinent circumference area of the headpiece, because the "excess" material volume, which is made available by the wall thickening, prevents the formation of the constriction produced in the known method during the flowing process caused by the compression, in that it fills the otherwise formed dead space.

Advantageously, the headpiece is provided with such an annular groove, which has a larger inside diameter on the base of the groove than in the area further away from the base of the groove, and the thickening is formed at a distance from the base of the groove. With such a shaping, the nonthickened wall area forms a kind of bending joint on the circumference of the headpiece, by means of which the thickened wall area of the annular groove is joined together with the rest of the headpiece, so that even with a relatively voluminously shaped thickening, a shaping of the thickening, inwards and in the desired manner, is facilitated during compression as a result of the nonthickened wall area, which forms a bending joint.

An increase of the outside diameter of the headpiece, which perhaps remains after the compression and which is formed by the thickening, can again be eliminated, after the compression, by mechanical processing, in which the circumference of the headpiece is abraded to the theoretical diameter. Preferably, the abrasion is carrying out by machining the area of the thickening. The filter element can be shaped in its outer contour in this manner so that the circumference of the headpiece is joined, in an aligned manner, with the protective basket, which covers the filter mat on its outer side, without a substantial gap forming a clearance space.

The object of the invention is also a filter element, which is produced in accordance with the method of the invention and which has the features of claim 6.

BRIEF DESCRIPTION OF THE DRAWINGS

The invention is explained in detail below with the aid of the drawing. The figures of the drawing show the following:

FIG. 1 a broken-off, one-side view of the area, adjacent to the headpiece, of a filter element produced according to the state of the art, which is shown in a longitudinal section;

FIG. 2 a broken-off, one-side sectional view, which also corresponds to FIG. 1, showing the area of a filter element, provided for the execution of the method of the invention, which is adjacent to the headpiece, before the sealing connection between the filter mat and headpiece is established; and FIG. 3 a view corresponding to FIG. 2, but after the sealing connection has been established by carrying out the method, in accordance with the invention.

DETAILED DESCRIPTION OF THE INVENTION

FIG. 1 shows the head-side area of a tubular filter element of the usual type, in which the sealing connection between a headpiece 1, made of stainless steel, and the upper edge 3 of a filter mat 5, is established by a method in accordance with the state of the art. The head-side edge 3 of the filter mat 5, also made of stainless steel, is accepted in the headpiece 1, in a circumferential annular groove 7, shaped therein. The wall 9, bordering the annular groove 7 on the outer side and adjacent to the circumference, is pressed radially inwards by means of pressure prongs or a rolling tool, so as to form the sealing connection between the headpiece 1 and filter mat 5, wherein a constriction 11, reducing areas of the diameter of the headpiece 1, is brought about. The folds of the filter mat 5, formed as a folding body, in the usual manner, are placed in the area of the constriction 11 next to one another and pressed against the wall 13 of the headpiece 1, limiting inwards the annular groove 7, so that the sealing connection is established.

The headpiece 1 of the filter element is provided with a central passage 15 for the filtered medium, in the usual manner. A support tube arrangement 17, which carries the filter mat 5 and supports it inwardly, is connected, via a soldered connection 19, with the inside edge of the passage 15 of the headpiece 1. A protective basket 21 surrounding the filter mat 5 on the outside forms a support of the filter mat 5 toward the outside, so as to prevent, for example, in the case of back-rinsing processes, a lifting of the filter mat 5 from the support tube arrangement 17.

As can be seen clearly from FIG. 1, a circumferential area of the filter element with a reduced outside diameter arises due to the constriction 11, wherein a dead space 23 is formed in a filter element which is accepted in the seat of a pertinent filter device, in which a fluid volume accumulates and stagnates during operation, which results in the formation of lumps, a solidification of the melt, and similar disturbing effects.

FIGS. 2 and 3 show the corresponding, head-side area of a filter element, produced in accordance with the method of the invention, wherein in FIG. 2, the state before the final establishing of the sealing connection between the headpiece 1 and edge 3 of the filter mat 5 by compression is shown. As can be seen from the figure, the limiting wall 9 of the annular groove 7 adjacent to the outer circumference, in the filter element produced in accordance with the invention, is provided in the headpiece 1 at a distance from the base of the groove 25 with a thickening 27, which is shaped in such a way that its curve bottom side lies on the edge 3 of the filter mat 5 and with its outer side 31 in the unshaped state, that is, before compression (as shown in FIG. 2) forms an area of increased diameter at the headpiece 1. Due to the curvature of the inner side 29 inwards, the annular groove 7 in the area of the base of the groove 25 has a greater inside diameter than in the adjoining area.

FIG. 3 shows the state after carrying out compression, wherein the edge 3 of the filter mat 5 is pressed together between the curved inner side 29 and the opposite wall 13 of the annular groove 7 for the establishing of the sealing connection. As can be seen from FIG. 3, the nonthickened area 33, via which the thickening 27 of the wall 9 is in connection with the base of the groove 25, acts as a kind of bending joint during the compressing process.

A particularly good sealing is attained during the compression, if the wall 13 of the annular groove 7, opposite the thickening 27, has a rib-like curvature (not depicted in the drawing), which protrudes against the curved inner side 29 of the thickening 27 and which forms a compression gap of increased surface pressure with the inner side 29.

FIG. 3 shows the outer side 31 of the thickening 27 after the compression, in an essentially aligned position with reference to the outer side of the protective basket 21. A projection of the outer side 31 beyond a desired theoretical diameter, possibly present after the compression, or pressure marks formed on the outer side 31 by the action of pressure tools during the compression can be eliminated by mechanical processing, such as the machining of the headpiece 1, after compression. As can be seen, the method of the invention avoids the formation of a circumferential constriction in the connecting area between the headpiece 1 and the sealing mat 5 and thus, the formation of a dead space, which could lead to a collection of stagnating fluid medium.

What is claimed is:

1. A method for establishing a sealing connection between a filter mat of a tubular filter element and a metal headpiece, which metal headpiece encloses said filter element on an end thereof and in which headpiece there is an annular groove which accepts an edge of the filter mat, said annular groove defined by an outer wall and an inner wall of said headpiece, comprising compressing said outer wall inwardly from a circumference of the headpiece, so as to reduce the annular groove in size by applying said compressive force directed radially inwardly and thereby compress the filter mat located in the annular groove of the headpiece, wherein the outer wall of the annular groove adjacent to the mat is provided with a thick portion which extends outwardly beyond a portion of the headpiece away from the outer wall, and wherein said compressing is carried out by applying the compressive force for compression in the area of the thick portion to compress the thick portion of the outer wall inwardly to not extend beyond the diameter of the headpiece.

2. The method according to claim 1, further comprising abrading the circumferential outer side of the thick portion by mechanical processing to obtain the diameter after the final establishing of the sealing connection of the headpiece after the compression.

3. The method according to claim 2, wherein the abrading of the thick portion is carried out by machining.

4. The method according to claim 1, wherein the headpiece is provided with an annular groove having a base, which has a greater inside diameter on the base of the groove than in the area further away from the base of the groove, and the thick portion is formed at a distance from the base of the groove.

5. The method according to claim 4, wherein an area of said wall which is a radially inner wall of the annular groove, opposite the thick portion, has a rib curvature, which protrudes radially toward the thick portion.

6. The method according to one of claim 1, wherein the headpiece is made of stainless steel and said filter mat is made of stainless steel.

7. A filter element, produced according to the method of claim 1, with a headpiece which accepts the edge of a filter mat in an annular groove, wherein a wall of the annular groove, which is adjacent to the mat, has a thick portion which reduces its inside diameter and which is pressed against the adjacent area of the filter mat to form said sealing connection.

8. The method according to claim 2, wherein said headpiece is provided with an annular groove, which has a greater outer diameter on the base of the groove than in the area further away from the base of the groove, and the thick portion is formed at a distance from the base of the groove.

9. The method according to claim 3, wherein the headpiece is provided with an annular groove, which has a greater inside diameter on the base of the groove than in the area further away from the base of the groove, and that the thick portion is formed at a distance from the base of the groove.

10. The method according to claim 2, wherein headpiece is made of stainless steel and said filter mat is made of stainless steel.

11. The method according to claim 3, wherein the headpiece is made of stainless steel and said filter mat is made of stainless steel.

12. The method according to claim 4, wherein the headpiece is made of stainless steel and said filter mat is made of stainless steel.

13. The method according to claim 5, wherein the headpiece is made of stainless steel and said filter mat is made of stainless steel.

14. A filter element, produced according to the method of claim 2, comprising a headpiece which accepts an edge of said filter mat in an annular groove, said annular groove having a wall, which is adjacent to the said headpiece having a thick portion which is pressed against an adjacent area of said metal filter mat for forming a sealing connection with said filter mat.

15. A filter element, produced according to the method of claim 3, comprising a headpiece which accepts an edge of said filter mat in an annular groove, said annular groove having a wall, which is adjacent to the said headpiece having a thick portion which is pressed against an adjacent area of said metal filter mat for forming a sealing connection with said filter mat.

16. A filter element, produced according to the method of claim 4, comprising a headpiece which accepts an edge of said filter mat in an annular groove, said annular groove having a wall, which is adjacent to the said headpiece having a thick portion which is pressed against an adjacent area of said metal filter mat for forming a sealing connection with said filter mat.

17. A filter element, produced according to the method of claim 5, comprising a headpiece which accepts an edge of said filter mat in an annular groove, said annular groove having a wall, which is adjacent to the said headpiece having a thick portion which is pressed against an adjacent area of said metal filter mat for forming a sealing connection with said filter mat.

18. A filter element, produced according to the method of claim 6, comprising a headpiece which accepts an edge of said filter mat in an annular groove, said annular groove having a wall, which is adjacent to the said headpiece having a thick portion which is pressed against an adjacent area of said metal filter mat for forming a sealing connection with said filter mat.

19. A method for establishing a sealing connection between a filter mat of a tubular filter element and a metal headpiece having a circumference comprising:

inserting said filter element into the metal headpiece so as to enclose an end of said filter element in an annular groove in said metal headpiece, the annular groove being defined by a base portion of the metal headpiece which accepts an edge of said filter mat, and an outer wall and an inner wall, said outer wall forming a thickened part at a proximate distance from the base of the groove and a thinner part adjacent said base, said thickened part of the outer wall extending beyond the circumference of the base portion of said headpiece, said thinner part forming a bendable portion, said inner wall being opposite said outer wall, compressing said outer wall inwardly from the circumference of the headpiece by compressive force directed radially inwardly towards said thickened part to cause said thickened part to bend at the thinner part of said outer wall to thereby reduce space between the inner and outer walls of said groove and compress said filter element, said thickened part being displaced by said compressive force to conform with the circumference of said headpiece.

* * * * *